(12) United States Patent
Uchida et al.

(10) Patent No.: US 12,386,102 B2
(45) Date of Patent: Aug. 12, 2025

(54) OPTICAL ELEMENT, OPTICAL SYSTEM, AND OPTICAL APPARATUS

(71) Applicant: CANON KABUSHIKI KAISHA, Tokyo (JP)

(72) Inventors: Kazue Uchida, Tochigi (JP); Masuo Ban, Tochigi (JP)

(73) Assignee: Canon Kabushiki Kaisha, Tokyo (JP)

( * ) Notice: Subject to any disclaimer, the term of this patent is extended or adjusted under 35 U.S.C. 154(b) by 259 days.

(21) Appl. No.: 18/180,750

(22) Filed: Mar. 8, 2023

(65) Prior Publication Data

US 2023/0296809 A1 Sep. 21, 2023

(30) Foreign Application Priority Data

Mar. 16, 2022 (JP) ................ 2022-041285

(51) Int. Cl.
*G02B 1/115* (2015.01)
*G02B 1/111* (2015.01)
*G02B 1/18* (2015.01)
*G02B 3/00* (2006.01)
*G02B 7/02* (2021.01)

(52) U.S. Cl.
CPC .............. *G02B 1/115* (2013.01); *G02B 1/111* (2013.01); *G02B 1/18* (2015.01); *G02B 3/0062* (2013.01); *G02B 7/02* (2013.01)

(58) Field of Classification Search
CPC .............. G02B 1/11–1/115; G02B 1/18; G02B 3/00–3/14
See application file for complete search history.

(56) References Cited

U.S. PATENT DOCUMENTS

| 10,345,489 | B2 * | 7/2019 | Fukaya | ............... C03C 17/3452 |
| 2005/0195503 | A1 * | 9/2005 | Chen | ................... G02B 27/0006 359/819 |
| 2012/0028005 | A1 * | 2/2012 | Zheng | .................... C23C 14/10 427/164 |
| 2014/0329072 | A1 * | 11/2014 | Hirasawa | .............. C23C 16/402 427/576 |

FOREIGN PATENT DOCUMENTS

| JP | 2009-092746 A | 4/2009 |
| WO | 2013/118622 A1 | 8/2013 |

OTHER PUBLICATIONS

Machine translation of JP 2009092746. Retrieved Jan. 14, 2025.*
Dobrowolski, J.A. (eds. Bass et al.). "Chapter 42: Optical Properties of Films and Coatings", Handbook of Optics, vol. I: Fundamentals, Techniques, and Design, (1995); pp. 42.3 to 42.130.*

* cited by examiner

*Primary Examiner* — Prashant J Khatri
(74) *Attorney, Agent, or Firm* — Canon U.S.A., Inc. IP Division (57) ABSTRACT

An optical element includes a substrate and an antireflection film. The antireflection film comprises a first film formed on the substrate and a second film formed on the first film. The second film comprises a first layer, a second layer, and a third layer arranged consecutively in order from a side closer to the first film. The first layer includes magnesium fluoride. The second layer includes silicon oxide and aluminum oxide. The third layer includes a fluorine-containing organic compound.

20 Claims, 8 Drawing Sheets

OPTICAL ELEMENT, OPTICAL SYSTEM, AND OPTICAL APPARATUS

BACKGROUND

Technical Field

One of the aspects of the disclosure relates to an optical element, an optical system, and an optical apparatus.

Description of the Related Art

Japanese Patent Laid-Open No. 2009-92746 discloses an antireflection film that includes an $MgF_2$ layer as the outermost surface and an antifouling layer made of a fluorine-containing organic compound formed on a surface of the antireflection film. PCT International Publication No. 2013/118622 discloses an antireflection film that includes a $SiO_2$ layer formed by a vacuum deposition method on a surface of an $MgF_2$ layer as the outermost surface, and an antifouling film made of fluororesin provided on the surface of the $SiO_2$ layer.

The structure of the antireflection film disclosed in Japanese Patent Laid-Open No. 2009-92746 has low adhesion between the $MgF_2$ layer and the antifouling layer, and may cause the film to peel off. The structure of the antireflection film disclosed in PCT International Publication No. 2013/118622 has low adhesion between the $MgF_2$ layer and the $SiO_2$ layer because of a large tensile stress of the $MgF_2$ layer, and may cause the film to peel off. Therefore, none of the structures of the antireflection films disclosed in Japanese Patent Laid-Open No. 2009-92746 and PCT International Publication No. 2013/118622 can provide an optical element that has high mechanical strength, environmental durability, and antifouling performance.

SUMMARY

One of the aspects of the embodiment provides an optical element that can have high mechanical strength, environmental durability, and antifouling performance.

An optical element according to one aspect of the disclosure includes a substrate and an antireflection film. The antireflection film comprises a first film formed on the substrate and a second film formed on the first film. The second film comprises a first layer, a second layer, and a third layer arranged consecutively in order from a side closer to the first film. The first layer includes magnesium fluoride. The second layer includes silicon oxide and aluminum oxide. The third layer includes a fluorine-containing organic compound.

An optical element according to another aspect of the disclosure includes a substrate and an antireflection film. The antireflection film consists of a first film formed on the substrate and a second film formed on the first film. The second film consists of a first layer, a second layer, a third layer, and a fourth layer in order from a side closer to the first film. Each of the first layer and third layer includes silicon oxide and aluminum oxide. The second layer includes magnesium fluoride. The fourth layer includes a fluorine-containing organic compound.

An optical system and an optical apparatus each including one of the above optical elements also constitute another aspect of the disclosure.

Further features of the disclosure will become apparent from the following description of embodiments with reference to the attached drawings.

DESCRIPTION OF THE EMBODIMENTS

Referring now to the accompanying drawings, a detailed description will be given of embodiments according to the disclosure.

Figure 1:
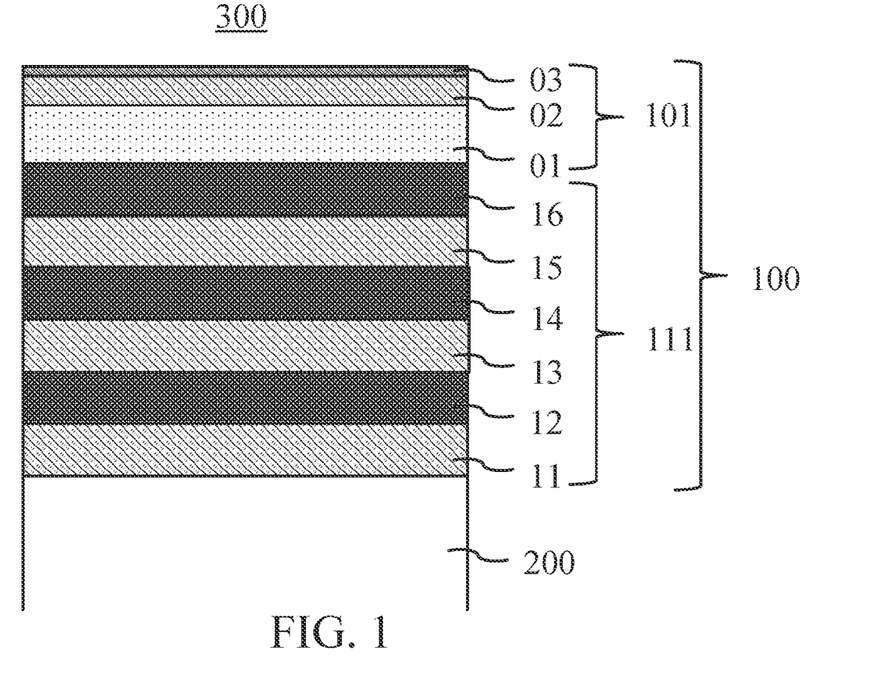
FIG. 1 is a schematic sectional view of an optical element according to each of Examples 1 to 8.

Referring now to FIG. 1, a description will be given of a schematic structure of an optical element 300 according to each of Examples 1 to 8. FIG. 1 is a schematic sectional view illustrating the optical element 300. The optical element 300 includes a substrate (base material) 200 and an antireflection film 100 formed on the substrate 200. The substrate 200 is, for example, a transparent substrate made of a resin material or a glass material. The antireflection film 100 includes a multilayer film (first film) 111 and a multilayer film (second film) 101 in order from the substrate 200. That is, the antireflection film 100 includes the multilayer film 111 formed on the substrate 200 and the multilayer film 101 formed on the multilayer film 111 (formed farthest from the substrate 200).

The multilayer film 111 includes layers 11, 12, 13, 14, 15, and 16 in order from the side closer to the substrate 200. The multilayer film 111 includes, but is not limited to, six layers in this example. The multilayer film 111 may have any number of layers as long as it has one or more layers. The multilayer film 101 has three layers, a layer (first layer) 01, a layer (second layer) 02, and a layer 03 in order from the side closer to the multilayer film 111.

The layer 01 includes magnesium fluoride ($MgF_2$). The layer 02 includes silicon oxide ($SiO_2$) and aluminum oxide ($Al_2O_3$). The silicon oxide material containing a small amount of aluminum is known to form a denser film upon vapor deposition than a material that contains no aluminum. Therefore, the layer 02 becomes a strong film with excellent scratch resistance and has a very large compressive stress. The layer 03, which is the outermost layer of the antireflection film 100, includes a fluorine-containing organic compound and has excellent water repellency and oil repellency. Therefore, water droplets and dirt that have been put on the layer 03 can be easily removed.

The layers 02 and 03 are strongly adhered to each other because the silicon oxide and the fluorine-containing organic compound contained in each layer are chemically bonded. On the other hand, the layer 01 containing magnesium fluoride has a large tensile stress. In a case where the layer 01 having tensile stress and the layer 02 having compressive stress are close to each other, the respective stresses are canceled and the adhesion between the layers 01 and 02 can be improved. In the thus-structured the multilayer film 101, the film adhesion and the abrasion resistance are improved.

Examples 1 to 8 may satisfy the following inequality (1):

$$\lambda/8 \le n_1 d_1 + n_2 d_2 + n_3 d_3 \le \lambda/2 \quad (1)$$

where $n_1$, $n_2$, and $n_3$ are refractive indices for the d-line of the layers 01, 02, and 03, $d_1$, $d_2$, and $d_3$ (nm) are physical film thicknesses of the layers 01, 02, and 03, respectively, and $\lambda$ is a wavelength of the d-line.

Inequality (1) may be replaced with inequality (1a) below:

$$\lambda/6 \le n_1 d_1 + n_2 d_2 + n_3 d_3 \le \lambda/3 \quad (1a)$$

The antireflection film 100 improves the antireflection performance when the outermost layer (uppermost layer) is made of a material with a lower refractive index and has an optical film thickness of about $\lambda/4$. Examples 1 to 8 satisfy inequality (1) and thereby improves the antireflection performance by regarding the multilayer film 101 as a layer substantially equivalent to the low refractive index material of the outermost layer.

Examples 1 to 8 may satisfy the following inequality (2):

$$0.2 \le n_1 d_1 / (n_1 d_1 + n_2 d_2) \le 0.9 \quad (2)$$

Inequality (2) may be replaced with inequality (2a) below:

$$0.6 \le n_1 d_1 / (n_1 d_1 + n_2 d_2) \le 0.9 \quad (2a)$$

If the film thickness of the layer 01 of the multilayer film 101 becomes larger, an average refractive index of the multilayer film 101 becomes lowered but it becomes difficult to secure the adhesion due to the increase in tensile stress. On the other hand, if the film thickness of the layer 02 becomes larger, the tensile stress is reduced and it becomes easier to secure adhesion, but the average refractive index of the multilayer film 101 increases. Maintaining the film thickness of each film satisfying inequality (2) can achieve both the antireflection performance and the adhesion.

The substrate 200 made of a resin material may be deformed or cracked due to heating. Thus, the antireflection film 100 needs to be formed without heating (or with low-temperature heating of 80° C. or less). Magnesium fluoride vapor-deposited without heating (or by heating at a low temperature of 80° C. or less) has a low film strength. A resin material generally has a larger coefficient of thermal expansion than that of glass. Since the substrate 200 itself easily expands, forming a film with a large compressive stress on the substrate 200 can easily prevent film cracking and film peeling. From the above two points, the magnesium fluoride layer may be sandwiched between layers containing a silicon oxide material containing a small amount of aluminum.

Examples 1 to 8 may satisfy the following inequality (3):

$$1.4 \le n_2 \le 1.5 \quad (3)$$

In Examples 1 to 8, the layer 02 may include silicon oxide at a weight ratio of 90% or more. The layer 02 may contain aluminum oxide at a weight ratio of 10% or less. Even a silicon oxide film containing aluminum oxide at a weight ratio of 0.001% can prevent film cracking and film peeling when combined with a magnesium fluoride film. Since the multilayer film 101 is a layer equivalent to the outermost low-refractive-index material layer, the antireflection performance deteriorates if the refractive index becomes 1.5 or higher.

Figure 2:
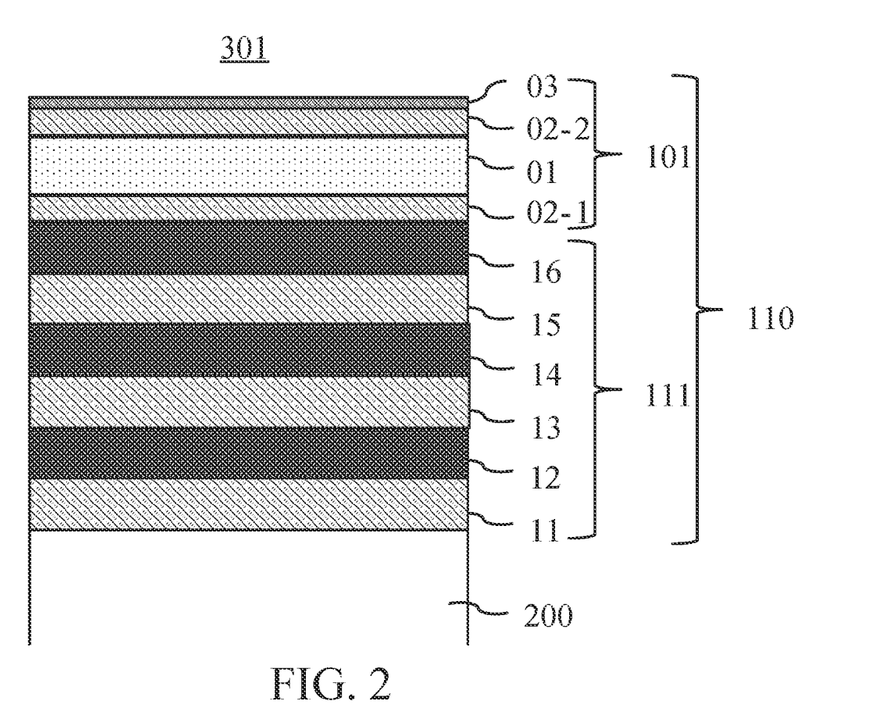
FIG. 2 is a schematic sectional view of an optical element according to each of Examples 9 to 12.

Referring now to FIG. 2, a description will be given of a schematic structure of an optical element 301 according to each of Examples 9 to 12. FIG. 2 is a schematic sectional view of the optical element 301. The optical element 301 includes a substrate (base material) 200 and an antireflection film 110 formed on the substrate 200. The antireflection film 110 includes a multilayer film (first film) 111 and a multilayer film (second film) 101 in order from the substrate 200. That is, the antireflection film 100 includes the multilayer film 111 formed on the substrate 200 and the multilayer film 101 formed on the multilayer film 111 (formed farthest from the substrate 200).

The multilayer film 101 includes, in order from the side closer to the multilayer film 111, layer (first layer) 02-1, layer (second layer) 01, layer (third layer) 02-2, and layer (fourth layer) 03. The layer 02-1 includes silicon oxide and a small amount of aluminum (aluminum oxide). The layer 01 includes magnesium fluoride. The layer 02-2 includes silicon oxide and a small amount of aluminum (aluminum oxide). The layer 03 includes a fluorine-containing organic compound.

Examples 9 to 12 may satisfy the following inequality (4):

$$\lambda/8 \le n_{2-1} d_{2-1} + n_1 d_1 + n_{2-2} d_{2-2} + n_3 d_3 \le \lambda/2 \quad (4)$$

where $n_{2-1}$, $n_1$, $n_{2-2}$, and $n_3$ are refractive indices for the d-line of the layers 02-1, 01, 02-2, and 03, $d_2$-1, $d_1$, $d_2$, and $d_3$ (nm) are physical film thicknesses of the layers 02-1, 01, 02-2, and 03, respectively, and $\lambda$ is the wavelength of the d-line.

Inequality (4) may be replaced with inequality (4a) below:

$$\lambda/6 \le n_{2-1} d_{2-1} + n_1 d_1 + n_{2-2} d_{2-2} + n_3 d_3 \le \lambda/3 \quad (4a)$$

This example may satisfy the following inequalities (5) and (6):

$$0.2 \le n_1 d_1 / (n_{2-1} d_{2-1} + n_1 d_1 + n_{2-2} d_{2-2}) \le 0.9 \quad (5)$$

$$0.5 \le n_{2-1} d_{2-1} / n_{2-2} d_{2-2} \le 2.0 \quad (6)$$

Inequalities (5) and (6) may be replaced with the following inequalities (5a) and (6a):

$$0.4 \le n_1 d_1 / (n_{2-1} d_{2-1} + n_1 d_1 + n_{2-2} d_{2-2}) \le 0.8 \quad (5a)$$

$$0.8 \le n_{2-1} d_{2-1} / n_{2-2} d_{2-2} \le 1.2 \quad (6a)$$

Examples 9 to 12 can improve the strength by sandwiching the layer 01 containing magnesium fluoride between the layers 02-1 and 02-2 containing silicon oxide and a small amount of aluminum (aluminum oxide). The stress of the substrate 200 can be canceled by applying compressive stress to the antireflection film 110.

Examples 9 to 12 may satisfy the following inequalities (7) and (8):

$$1.4 \leq n_{2\text{-}1} \leq 1.5 \tag{7}$$

$$1.4 \leq n_{2\text{-}2} \leq 1.5 \tag{8}$$

In Examples 9 to 12, each of the layers 02-1 and 02-2 may include silicon oxide at a weight ratio of 90% or more. Each of the layers 02-1 and 02-2 may include aluminum oxide at a weight ratio of 10% or less. Addition of aluminum is effective even if it is a very small amount. A silicon oxide film containing aluminum oxide even at a weight ratio of 0.001% can prevent film cracking and film peeling when combined with a magnesium fluoride film. Since the multilayer film 101 is a layer equivalent to the outermost low-refractive-index material layer, the antireflection performance deteriorates if the refractive index becomes 1.5 or higher.

In the optical elements 300 and 301, the film thickness $d_3$ of the layer 03 made of the fluorine-containing organic compound may satisfy the following inequality (9):

$$2 \leq d_3 \leq 10 \tag{9}$$

This is because if the film thickness is thin, the water repellency and antifouling effects are reduced, and the surface becomes cloudy, impairing its function.

In the optical elements 300 and 301, the material for the layer 03 may use a halogenated silane compound such as dimethyldichlorosilane, diethyldichlorosilane, or diphenylvinyldichlorosilane, or an alkoxysilane compound such as dimethyldiethoxysilane. The material for the layer 03 may use an aminosilane compound such as bis(dimethylamino) methylsilane, hexamethylsidilazane, or a fluorine-containing aminosilane compound. These fluorine-containing organic compounds are not particularly limited as long as they can impart functions such as water repellency, oil repellency and dust resistance.

The multilayer film 111 may be made of a combination of a high refractive index material and a medium refractive index material (having a refractive index of about 1.6 to 1.8 for the d-line), or layers (alternating layers) made by alternately laminating the high refractive index material and the low refractive index material. In a case where the substrate 200 is made of a resin material, the layers may be alternating layers of a high refractive index material and a low refractive index material. Since the resin material is likely to thermally expand, the low refractive index material may be the same material as that of the layer 02 having a large compressive stress. On the other hand, in a case where the substrate 200 is made of a glass material, the layer 11 of the multilayer film 111 may be made of a material containing aluminum oxide as the main component from the viewpoint of preventing white stains. The high refractive index material may be one of tantalum oxide, titanium oxide, lanthanum oxide, and zirconia oxide, or a material whose main component is a mixture of a plurality of them.

The film formation method of the antireflection film 100 (or the antireflection film 110) including the multilayer film 111 and the multilayer film 101 is not particularly limited as long as it is a physical vapor deposition method such as a vapor deposition method, a sputtering method, or an ion plating method. In particular, the vapor deposition method may be used because fluoride is less likely to decompose. In the vapor deposition method, methods for heating the vapor deposition material include a resistance heating method, an electron beam vapor deposition method, a laser vapor deposition method, and the like. The electron beam evaporation method may be used because it can directly heat the film material, so that the film can be formed on the substrate 200 in an unheated state, the contamination is small, and the film has relatively high quality. An ion beam assist method may also be used. An independent ion source plays a role of assisting vapor deposition, so that a dense and strong film with little absorption or scattering can be formed.

Each example will be specifically described below.

Example 1

FIG. 1 is a schematic sectional view of the optical element 300 according to Example 1. The optical element 300 according to this example is an optical element in which the antireflection film 100 is formed on the substrate 200. The substrate 200 is made of S-BSL7 (manufactured by OHARA) having a refractive index of 1.52 for the d-line. $SiO_2$ (Al at a weight ratio of 4.5%), $MgF_2$, $Ta_2O_5$, and $Al_2O_3$ are used as the layer materials. OF-SR (manufactured by Canon Optron) is used as the fluorine-containing organic compound. Table 1 illustrates the details of the film structure of the optical element according to this example. The refractive index and film thickness of each material satisfy inequalities (1), (2), (3), and (9).

The film formation method of the antireflection film 100 according to this example is as follows: The antireflection film 100 is formed by vapor deposition. The inside of the vacuum chamber of the vapor deposition apparatus is evacuated to a high vacuum region of around $2 \times 10^{-3}$ (Pa). The film formation temperature for each layer of the multilayer film 111 and the layers 01 and 02 of the multilayer film 101 is set to 200° C. and electron beam evaporation is used. In order to form a denser film, the ion beam assisted vapor deposition method is used. After it is confirmed that the inside of the vacuum chamber has reached a high vacuum state, Ar as an inert gas is introduced into the ion gun to discharge the ion gun. After the ion gun reaches a stable state, oxygen is introduced into the vacuum chamber, and ion-assisted vapor deposition is performed using oxygen ions at a vacuum pressure of about $1 \times 10^{-2}$ (Pa). For the layer 03 of multilayer film 101, the film formation temperature is set to 80° C. and the resistive heating deposition method is used. After the film formation is completed, excess OF-SR is removed by wiping the surface of the ejected optical element 300 with ethanol.

Figure 3:
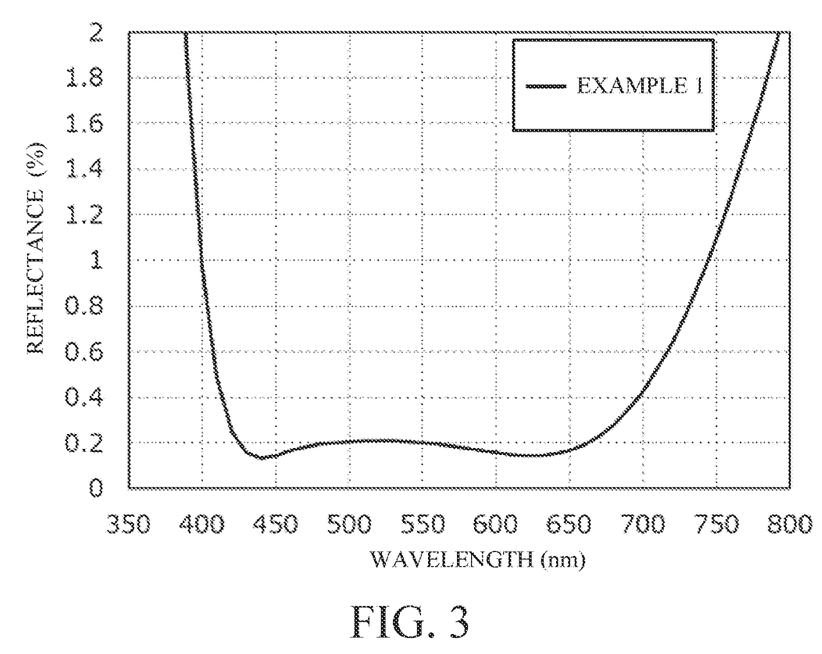
FIG. 3 illustrates a reflectance characteristic of the optical element according to Example 1 at an incident angle of 0 degrees.

FIG. 3 illustrates a reflectance characteristic of the optical element according to this example. In FIG. 3, a horizontal axis represents wavelength (nm) and a vertical axis represents reflectance (%). The reflectance is maintained to be 0.3% or less In the wavelength range of 420 to 680 nm, and an excellent characteristic is demonstrated.

The layer 01 made of magnesium fluoride has a strong tensile stress. On the other hand, the layer 02 made of silicon oxide containing aluminum at a weight ratio of 4.5% has strength and compressive stress. Placing the layer 02 having a strong compressive stress on top of the layer 01 having a strong tensile stress can cancel these stresses. Thereby, the antireflection film 100 is a film excellent in environmental reliability and less likely to cause cracks and peeling.

In order to confirm the durability of the antireflection film 100 under various conditions, the following durability tests are conducted.

(High-Temperature and High-Humidity Exposure Test (H-Temp & H-Humid in Table 13))

After the prepared sample is exposed in a constant temperature bath set at a temperature of 60° C. and a humidity of 90% for 1000 hours, the appearance of the antireflection film 100 is visually observed.

(Low-Temperature Exposure Test (Low-Temp Test in Table 13))

After the prepared sample is exposed in a constant temperature bath set at −30° C. for 1000 hours, the appearance of the antireflection film 100 is visually observed.

(High-Temperature Exposure Test (High-Temp Test in Table 13))

After the prepared sample is exposed in a constant temperature bath set at 70° C. for 12 hours, the appearance of the antireflection film 100 is visually observed.

(Adhesion Test)

After an adhesive tape is attached to the surface of the antireflection film 100 of the prepared sample, the tape is peeled off in a direction perpendicular to the film surface. This operation is repeated 5 times, and it is visually observed whether or not the film is peeled off.

(Surface Hardness Test)

The antireflection film 100 is rubbed back and forth 10 times with a load of about 200 g on a silicon paper soaked with a solvent, and then the appearance of the antireflection film 100 is visually observed.

Table 13 illustrates the results of the durability tests. In any test, it can be confirmed that an excellent antireflection film is formed without film cracking or film peeling.

TABLE 1

| | | | Refractive Index (d-line) | Physical Film Thickness (nm) |
|---|---|---|---|---|
| Multilayer Film 101 | Layer 03 | Fluorine-containing Organic Compound | 1.35 | 3.0 |
| | Layer 02 | SiO₂ (Al-containing: weight ratio of 4.5%) | 1.47 | 20.0 |
| | Layer 01 | MgF₂ | 1.39 | 69.2 |
| Multilayer Film 111 | Layer 16 | Ta₂O₅ | 2.11 | 38.0 |
| | Layer 15 | Al₂O₃ | 1.63 | 12.0 |
| | Layer 14 | Ta₂O₅ | 2.11 | 56.2 |
| | Layer 13 | Al₂O₃ | 1.63 | 16.8 |
| | Layer 12 | Ta₂O₅ | 2.11 | 12.0 |
| | Layer 11 | Al₂O₃ | 1.63 | 70.2 |
| Substrate 200 | | S-BSL7 | 1.52 | — |

Example 2

Figure 4:
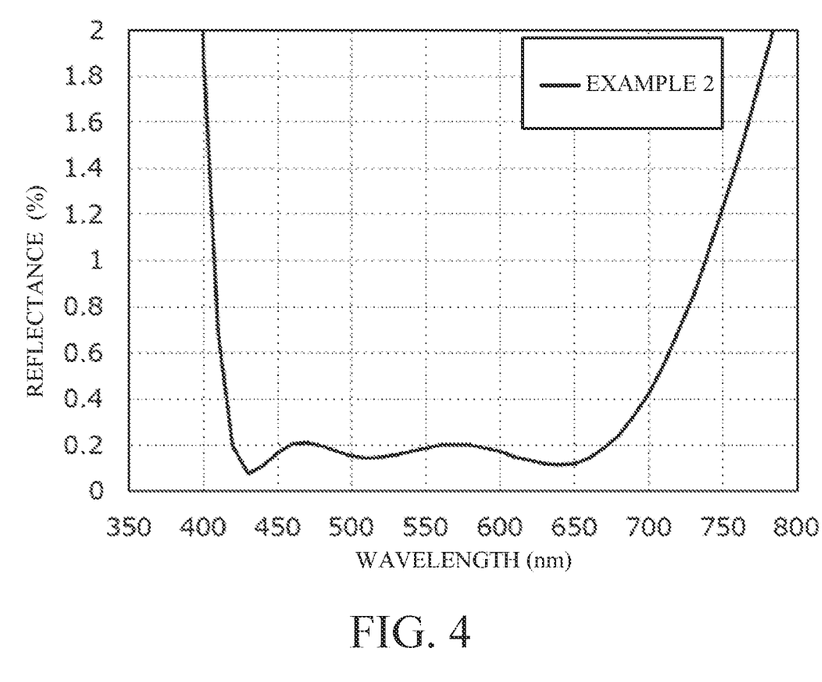
FIG. 4 illustrates a reflectance characteristic of the optical element according to Example 2 at an incident angle of 0 degrees.

In the optical element 300 according to Example 2, the substrate 200 is made of S-BSM14 (manufactured by OHARA) having a refractive index of 1.60 for the d-line. The optical element 300 according to this example is manufactured using the same vapor deposition material and under the same vapor deposition condition as those of Example 1. Table 2 illustrates the details of the film structure of the optical element according to this example. The refractive index and film thickness of each material satisfy inequalities (1), (2), (3), and (9). FIG. 4 illustrates a reflectance characteristic of the optical element according to this example. In FIG. 4, a horizontal axis represents wavelength (nm) and a vertical axis represents reflectance (%). The reflectance is maintained to be 0.25% or less in the wavelength range of 420 to 680 nm, and an excellent characteristic is demonstrated.

Table 13 illustrates the results of the durability tests. In any test, it can be confirmed that an excellent antireflection film is formed without film cracking or film peeling.

TABLE 2

| | | | Refractive Index (d-line) | Physical Film Thickness (nm) |
|---|---|---|---|---|
| Multilayer Film 101 | Layer 03 | Fluorine-containing Organic Compound | 1.35 | 3.0 |
| | Layer 02 | SiO₂ (Al-containing: weight ratio of 4.5%) | 1.47 | 25.0 |
| | Layer 01 | MgF₂ | 1.39 | 65.9 |
| Multilayer Film 111 | Layer 16 | Ta₂O₅ | 2.11 | 47.0 |
| | Layer 15 | Al₂O₃ | 1.63 | 12.0 |
| | Layer 14 | Ta₂O₅ | 2.11 | 62.8 |
| | Layer 13 | Al₂O₃ | 1.63 | 42.2 |
| | Layer 12 | Ta₂O₅ | 2.11 | 12.0 |
| | Layer 11 | Al₂O₃ | 1.63 | 157.7 |
| Substrate 200 | | S-BSM14 | 1.60 | — |

Example 3

Figure 5:
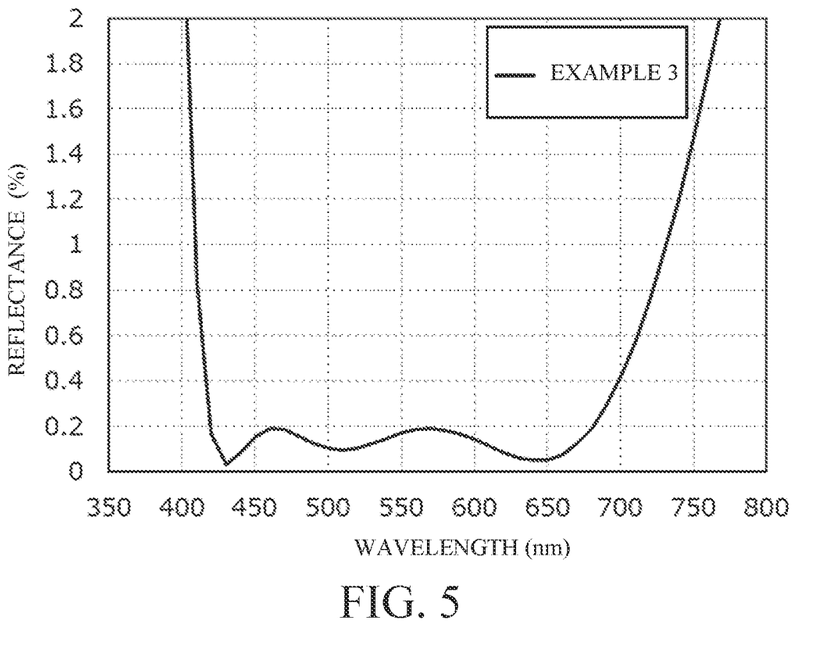
FIG. 5 illustrates a reflectance characteristic of the optical element according to Example 3 at an incident angle of 0 degrees.

In the optical element 300 according to Example 3, the substrate 200 is made of S-BAH32 (manufactured by OHARA) having a refractive index of 1.67 for the d-line. SiO₂, Ta₂O₅, and MgF₂ containing Al at a weight ratio of 4.5% are used as layer materials. OF-SR (manufactured by Canon Optron) is used as the fluorine-containing organic compound. The optical element 300 according to this example is manufactured under the same vapor deposition condition as that of Example 1. Table 3 illustrates the details of the film structure of the optical element according to this example. The refractive index and film thickness of each material satisfy inequalities (1), (2), (3), and (9). FIG. 5 illustrates a reflectance characteristic of the optical element according to this example. In FIG. 5, a horizontal axis represents wavelength (nm) and a vertical axis represents reflectance (%). The reflectance is maintained to be 0.25% or less in the wavelength range of 420 to 680 nm, and an excellent characteristic is demonstrated.

Table 13 illustrates the results of the durability tests. In any test, it can be confirmed that an excellent antireflection film is formed without film cracking or film peeling.

TABLE 3

| | | | Refractive Index (d-line) | Physical Film Thickness (nm) |
|---|---|---|---|---|
| Multilayer Film 101 | Layer 03 | Fluorine-containing Organic Compound | 1.35 | 3.0 |
| | Layer 02 | SiO₂ (Al-containing: weight ratio of 4.5%) | 1.47 | 24.0 |
| | Layer 01 | MgF₂ | 1.39 | 67.3 |
| Multilayer Film 111 | Layer 16 | Ta₂O₅ | 2.11 | 56.0 |
| | Layer 15 | SiO₂ (Al-containing: weight ratio of 4.5%) | 1.47 | 12.0 |
| | Layer 14 | Ta₂O₅ | 2.11 | 56.2 |
| | Layer 13 | SiO₂ (Al-containing: weight ratio of 4.5%) | 1.47 | 48.9 |
| | Layer 12 | Ta₂O₅ | 2.11 | 19.0 |

TABLE 3-continued

| | | | Refractive Index (d-line) | Physical Film Thickness (nm) |
|---|---|---|---|---|
| | Layer 11 | SiO$_2$ (Al-containing: weight ratio of 4.5%) | 1.47 | 44.6 |
| Substrate 200 | | S-BAH32 | 1.67 | — |

Example 4

Figure 6:
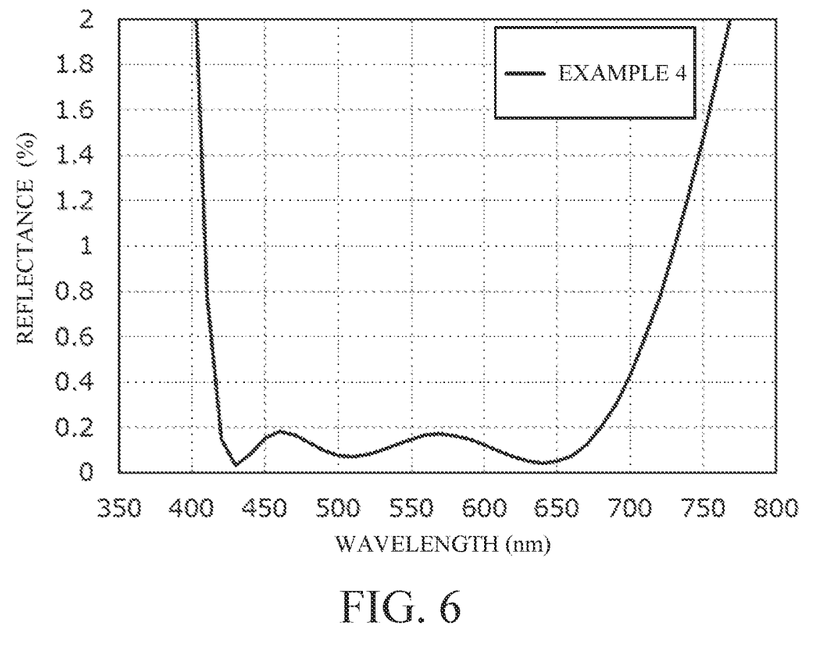
FIG. 6 illustrates a reflectance characteristic of the optical element according to Example 4 at an incident angle of 0 degrees.

In the optical element 300 according to Example 4, the substrate 200 is made of S-LAH66 (manufactured by OHARA) having a refractive index of 1.77 for the d-line. The optical element 300 according to this example is manufactured using the same vapor deposition material as that of Example 3 and under the same vapor deposition condition as that of Example 1. Table 4 illustrates the details of the film structure of the optical element according to this example. The refractive index and film thickness of each material satisfy inequalities (1), (2), (3), and (9). FIG. 6 illustrates a reflectance characteristic of the optical element according to this example. In FIG. 6, a horizontal axis represents wavelength (nm) and a vertical axis represents reflectance (%). The reflectance is maintained to be 0.2% or less in the wavelength range of 420 to 680 nm, and an excellent characteristic is demonstrated.

Table 13 illustrates the results of the durability tests. In any test, it can be confirmed that an excellent antireflection film is formed without film cracking or film peeling.

TABLE 4

| | | | Refractive Index (d-line) | Physical Film Thickness (nm) |
|---|---|---|---|---|
| Multilayer Film 101 | Layer 03 | Fluorine-containing Organic Compound | 1.35 | 3.0 |
| | Layer 02 | SiO$_2$ (Al-containing: weight ratio of 4.5%) | 1.47 | 15.0 |
| | Layer 01 | MgF$_2$ | 1.39 | 78.4 |
| Multilayer Film 111 | Layer 16 | Ta$_2$O$_5$ | 2.11 | 52.7 |
| | Layer 15 | SiO$_2$ (Al-containing: weight ratio of 4.5%) | 1.47 | 12.0 |
| | Layer 14 | Ta$_2$O$_5$ | 2.11 | 61.4 |
| | Layer 13 | SiO$_2$ (Al-containing: weight ratio of 4.5%) | 1.47 | 41.1 |
| | Layer 12 | Ta$_2$O$_5$ | 2.11 | 25.4 |
| | Layer 11 | SiO$_2$ (Al-containing: weight ratio of 4.5%) | 1.47 | 33.1 |
| Substrate 200 | | S-LAH66 | 1.77 | — |

Example 5

Figure 7:
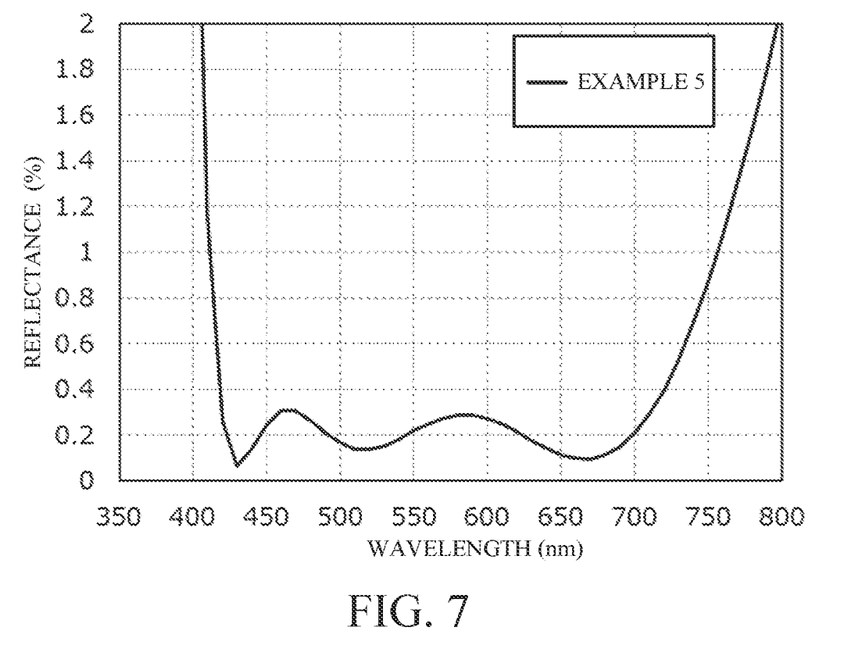
FIG. 7 illustrates a reflectance characteristic of the optical element according to Example 5 at an incident angle of 0 degrees.

In the optical element 300 according to Example 5, the substrate 200 is made of S-TIH53 (manufactured by OHARA) having a refractive index of 1.85 for the d-line. The optical element 300 according to this example is manufactured using the same vapor deposition material as that of Example 4 and under the same vapor deposition condition as that of Example 1. Table 5 illustrates the details of the film structure of the optical element according to this example. The refractive index and film thickness of each material satisfy inequalities (1), (2), (3), and (9). FIG. 7 illustrates a reflectance characteristic of the optical element according to this example. In FIG. 7, a horizontal axis represents wavelength (nm) and a vertical axis represents reflectance (%). The reflectance is maintained to be 0.3% or less in the wavelength range of 420 to 720 nm, and an excellent characteristic is demonstrated.

Table 13 illustrates the results of the durability tests. In any test, it can be confirmed that an excellent antireflection film is formed without film cracking or film peeling.

TABLE 5

| | | | Refractive Index (d-line) | Physical Film Thickness (nm) |
|---|---|---|---|---|
| Multilayer Film 101 | Layer 03 | Fluorine-containing Organic Compound | 1.35 | 3.0 |
| | Layer 02 | SiO$_2$ (Al-containing: weight ratio of 4.5%) | 1.47 | 30.0 |
| | Layer 01 | MgF$_2$ | 1.39 | 63.8 |
| Multilayer Film 111 | Layer 16 | Ta$_2$O$_5$ | 2.11 | 50.7 |
| | Layer 15 | SiO$_2$ (Al-containing: weight ratio of 4.5%) | 1.47 | 12.0 |
| | Layer 14 | Ta$_2$O$_5$ | 2.11 | 68.5 |
| | Layer 13 | SiO$_2$ (Al-containing: weight ratio of 4.5%) | 1.47 | 34.7 |
| | Layer 12 | Ta$_2$O$_5$ | 2.11 | 31.5 |
| | Layer 11 | SiO$_2$ (Al-containing: weight ratio of 4.5%) | 1.47 | 27.5 |
| Substrate 200 | | S-TIH53 | 1.85 | — |

Example 6

Figure 8:
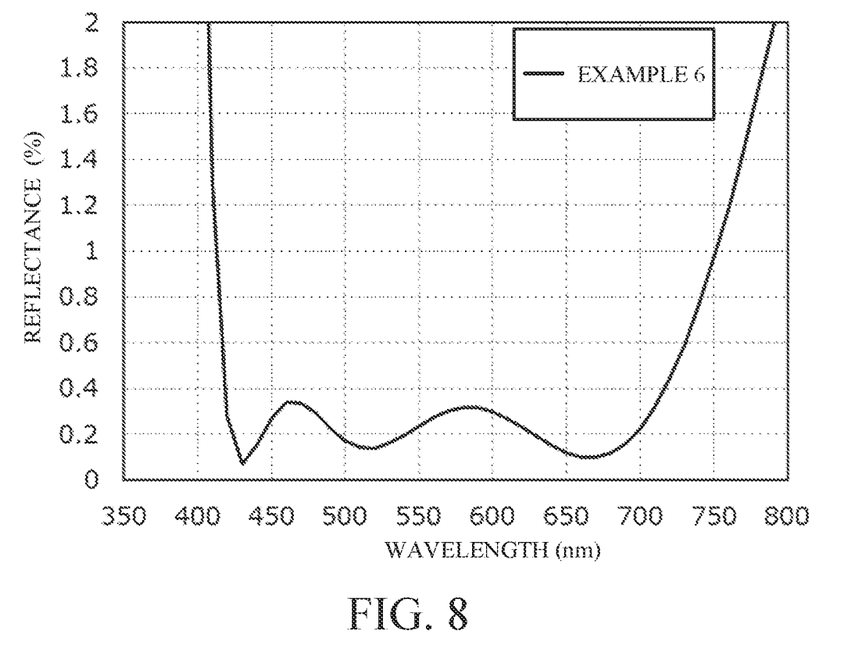
FIG. 8 illustrates a reflectance characteristic of the optical element according to Example 6 at an incident angle of 0 degrees.

In the optical element 300 according to Example 6, the substrate 200 is made of S-NPH3 (manufactured by OHARA) having a refractive index of 1.96 for the d-line. The optical element 300 according to this example is manufactured using the same deposition material as that of Example 4 and under the same deposition condition as that of Example 1. Table 6 illustrates the details of the film structure of the optical element according to this example. The refractive index and film thickness of each material satisfy inequalities (1), (2), (3), and (9). FIG. 8 illustrates a reflectance characteristic of the optical element according to this example. In FIG. 8, a horizontal axis represents wavelength (nm) and a vertical axis represents reflectance (%). The reflectance is maintained to be 0.4% or less in the wavelength range of 420 to 720 nm, and an excellent characteristic is demonstrated.

Table 13 illustrates the results of the durability tests. In any test, it can be confirmed that an excellent antireflection film is formed without film cracking or film peeling.

TABLE 6

| | | | Refractive Index (d-line) | Physical Film Thickness (nm) |
|---|---|---|---|---|
| Multilayer Film 101 | Layer 03 | Fluorine-containing Organic Compound | 1.35 | 3.0 |
| | Layer 02 | SiO$_2$ (Al-containing: weight ratio of 4.5%) | 1.47 | 35.0 |
| | Layer 01 | MgF$_2$ | 1.39 | 58.4 |
| Multilayer Film 111 | Layer 16 | Ta$_2$O$_5$ | 2.11 | 51.7 |
| | Layer 15 | SiO$_2$ (Al-containing: weight ratio of 4.5%) | 1.47 | 12.0 |
| | Layer 14 | Ta$_2$O$_5$ | 2.11 | 69.2 |

TABLE 6-continued

|  |  |  | Refractive Index (d-line) | Physical Film Thickness (nm) |
|---|---|---|---|---|
|  | Layer 13 | $SiO_2$ (Al-containing: weight ratio of 4.5%) | 1.47 | 32.3 |
|  | Layer 12 | $Ta_2O_5$ | 2.11 | 37.0 |
|  | Layer 11 | $SiO_2$ (Al-containing: weight ratio of 4.5%) | 1.47 | 23.7 |
| Substrate 200 |  | S-NPH3 | 1.96 | — |

Example 7

Figure 9:
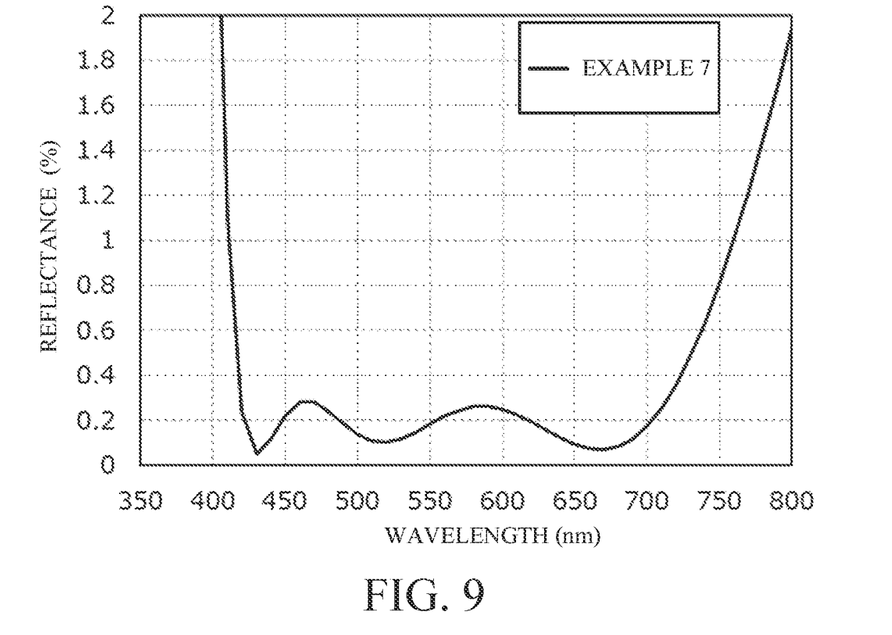
FIG. 9 illustrates a reflectance characteristic of the optical element according to Example 7 at an incident angle of 0 degrees.

In the optical element 300 according to Example 7, the substrate 200 is made of S-LAH79 (manufactured by OHARA) having a refractive index of 2.00 for the d-line. The optical element 300 according to this example is manufactured using the same deposition material as that of Example 4 and under the same deposition condition as that of Example 1. Table 7 illustrates the details of the film structure of the optical element according to this example. The refractive index and film thickness of each material satisfy inequalities (1), (2), (3), and (9). FIG. 9 illustrates a reflectance characteristic of the optical element according to this example. In FIG. 9, a horizontal axis represents wavelength (nm) and a vertical axis represents reflectance (%). The reflectance is maintained to be 0.3% or less in the wavelength range of 420 to 720 nm, and an excellent characteristic is demonstrated.

Table 13 illustrates the results of the durability tests. In any test, it can be confirmed that an excellent antireflection film is formed without film cracking or film peeling.

TABLE 7

|  |  |  | Refractive Index (d-line) | Physical Film Thickness (nm) |
|---|---|---|---|---|
| Multilayer Film 101 | Layer 03 | Fluorine-containing Organic Compound | 1.35 | 3.0 |
|  | Layer 02 | $SiO_2$ (Al-containing: weight ratio of 4.5%) | 1.47 | 15.0 |
|  | Layer 01 | $MgF_2$ | 1.39 | 81.8 |
| Multilayer Film 111 | Layer 16 | $Ta_2O_5$ | 2.11 | 44.7 |
|  | Layer 15 | $SiO_2$ (Al-containing: weight ratio of 4.5%) | 1.47 | 12.0 |
|  | Layer 14 | $Ta_2O_5$ | 2.11 | 78.3 |
|  | Layer 13 | $SiO_2$ (Al-containing: weight ratio of 4.5%) | 1.47 | 24.5 |
|  | Layer 12 | $Ta_2O_5$ | 2.11 | 41.6 |
|  | Layer 11 | $SiO_2$ (Al-containing: weight ratio of 4.5%) | 1.47 | 18.5 |
| Substrate 200 |  | S-LAH79 | 2.00 | — |

Example 8

Figure 10:
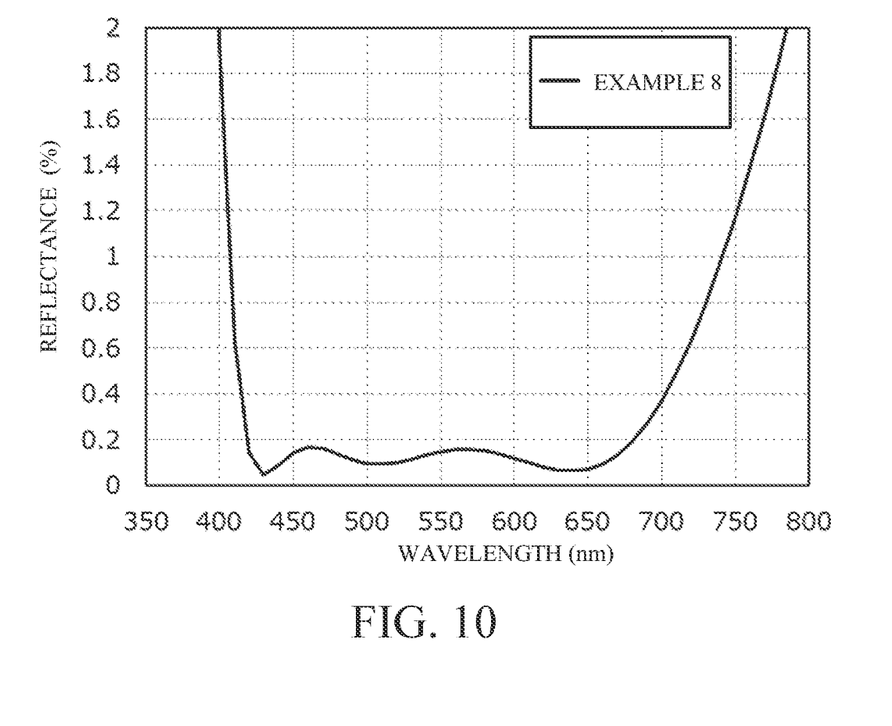
FIG. 10 illustrates a reflectance characteristic of the optical element according to Example 8 at an incident angle of 0 degrees.

In the optical element 300 according to Example 8, the substrate 200 is made of fluorite having a refractive index of 1.43 for the d-line. The layer materials use $SiO_2$ containing Al at a weight ratio of 4.5%, a mixture of $Ti_2O_3$ and $Ta_2O_5$, and $MgF_2$. OF-SR (manufactured by Canon Optron) is used as the fluorine-containing organic compound. Fluorite cracks when it is cooled rapidly. Therefore, the antireflection film 100 is vapor-deposited without heating. The optical element 300 according to this example is manufactured under the same vacuum and ion assist conditions as those of Example 1. $SiO_2$ containing Al at a weight ratio of 4.5%, a mixture of $Ti_2O_3$ and $Ta_2O_5$, and $MgF_2$ are subjected to ion-assisted deposition to increase strength. Table 8 illustrates the details of the film structure of the optical element according to this example. The refractive index and film thickness of each material satisfy inequalities (1), (2), (3), and (9). FIG. 10 illustrates a reflectance characteristic of the optical element according to this example. In FIG. 10, a horizontal axis represents wavelength (nm) and a vertical axis represents reflectance (%). The reflectance is maintained to be 0.2% or less in the wavelength range of 420 to 680 nm, and an excellent characteristic is demonstrated.

Table 13 illustrates the results of the durability tests. In any test, it can be confirmed that an excellent antireflection film is formed without film cracking or film peeling.

TABLE 8

|  |  |  | Refractive Index (d-line) | Physical Film Thickness (nm) |
|---|---|---|---|---|
| Multilayer Film 101 | Layer 03 | Fluorine-containing Organic Compound | 1.35 | 3.0 |
|  | Layer 02 | $SiO_2$ (Al-containing weight ratio of 4.5%) | 1.47 | 15.0 |
|  | Layer 01 | $MgF_2$ | 1.39 | 81.8 |
| Multilayer Film 111 | Layer 16 | $Ti_2O_3 + Ta_2O_5$ | 2.11 | 44.7 |
|  | Layer 15 | $SiO_2$ (Al-containing: weight ratio of 4.5%) | 1.47 | 12.0 |
|  | Layer 14 | $Ti_2O_3 + Ta_2O_5$ | 2.11 | 78.3 |
|  | Layer 13 | $SiO_2$ (Al-containing: weight ratio of 4.5%) | 1.47 | 24.5 |
|  | Layer 12 | $Ti_2O_3 + Ta_2O_5$ | 2.11 | 41.6 |
|  | Layer 11 | $SiO_2$ (Al-containing: weight ratio of 4.5%) | 1.47 | 18.5 |
| Substrate 200 |  | $CaF_2$ | 1.43 | — |

Example 9

Figure 11:
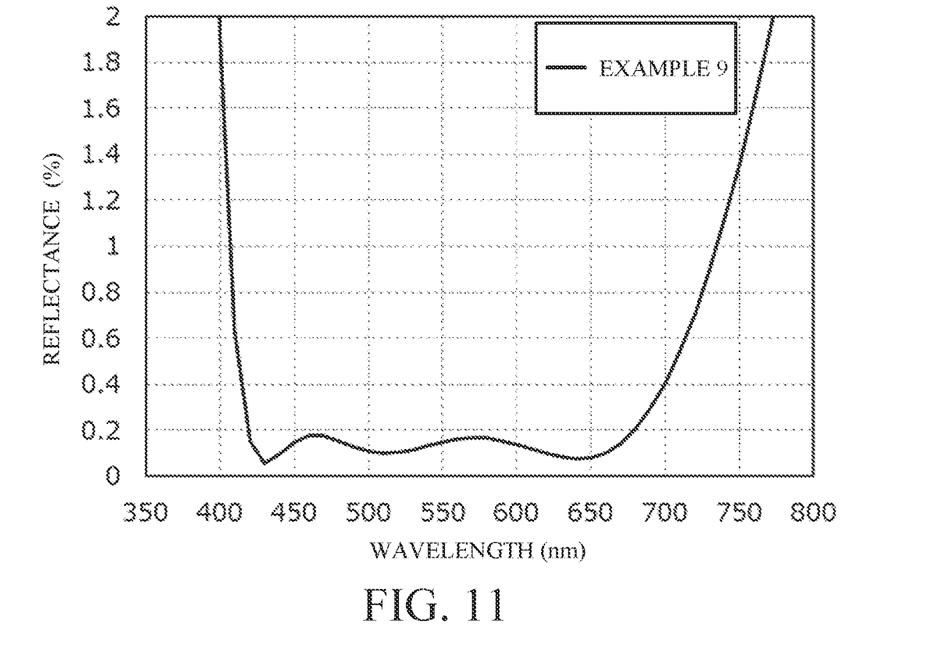
FIG. 11 illustrates a reflectance characteristic of the optical element according to Example 9 at an incident angle of 0 degrees.

The optical element 300 according to Example 9 is an optical element in which the antireflection film 110 is formed on the substrate 200. The substrate 200 is made of E48R (manufactured by Nippon Zeon Co., Ltd.) having a refractive index of 1.53 for the d-line. The layer materials use $SiO_2$ containing Al at a weight ratio of 4.5%, a mixture of $Ti_2O_3$ and $Ta_2O_5$, and $MgF_2$. OF-SR (manufactured by Canon Optron) is used as the fluorine-containing organic compound. E48R (substrate 200), which is a resin material, is deformed at a high temperature. Therefore, the antireflection film 100 is vapor-deposited without heating. The optical element 300 according to this example is manufactured under the same vacuum and ion assist conditions as those of Example 1. $SiO_2$ containing Al at a weight ratio of 4.5%, a mixture of $Ti_2O_3$ and $Ta_2O_5$, and $MgF_2$ are subjected to ion-assisted deposition to increase strength. Table 9 illustrates the details of the film structure of the optical element according to this example. The refractive index and film thickness of each material satisfy inequalities (4), (5), (6), (7), (8), and (9). FIG. 11 illustrates a reflectance characteristic of the optical element according to this example. In FIG. 11, a horizontal axis represents wavelength (nm) and a vertical axis represents reflectance (%). The reflectance is maintained to be 0.2% or less in the wavelength range of 420 to 680 nm, and an excellent characteristic is demonstrated.

Table 13 illustrates the results of the durability tests. In any test, it can be confirmed that an excellent antireflection film is formed without film cracking or film peeling.

TABLE 9

|  |  |  | Refractive Index (d-line) | Physical Film Thickness (nm) |
|---|---|---|---|---|
| Multilayer Film 101 | Layer 04 | Fluorine-containing Organic Compound | 1.35 | 3.0 |
|  | Layer 03 | $SiO_2$ (Al-containing: weight ratio of 4.5%) | 1.47 | 20.0 |
|  | Layer 02 | $MgF_2$ | 1.39 | 52.8 |
|  | Layer 01 | $SiO_2$ (Al-containing: weight ratio of 4.5%) | 1.47 | 20.0 |
| Multilayer Film 111 | Layer 16 | $Ti_2O_3 + Ta_2O_5$ | 2.11 | 54.8 |
|  | Layer 15 | $SiO_2$ (Al-containing: weight ratio of 4.5%) | 1.47 | 12.0 |
|  | Layer 14 | $Ti_2O_3 + Ta_2O_5$ | 2.11 | 52.0 |
|  | Layer 13 | $SiO_2$ (Al-containing: weight ratio of 4.5%) | 1.47 | 50.5 |
|  | Layer 12 | $Ti_2O_3 + Ta_2O_5$ | 2.11 | 12.0 |
|  | Layer 11 | $SiO_2$ (Al-containing: weight ratio of 4.5%) | 1.47 | 75.4 |
| Substrate 200 |  | E48R | 1.53 | — |

Example 10

Figure 12:
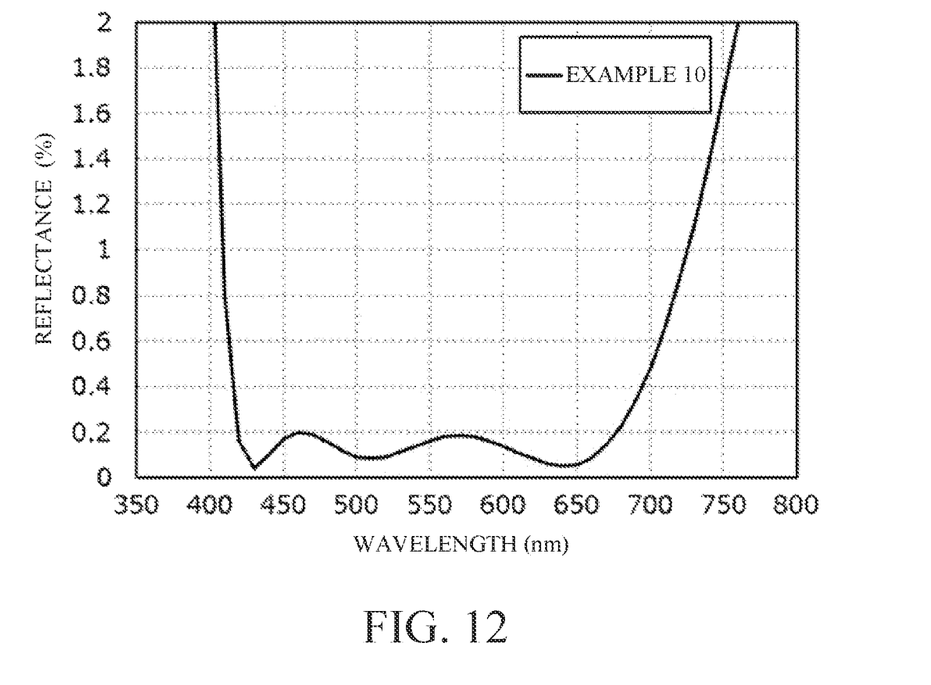
FIG. 12 illustrates a reflectance characteristic of the optical element according to Example 10 at an incident angle of 0 degrees.

In the optical element 301 according to Example 10, the substrate 200 is made of EP-5000 (manufactured by Mitsui Gas Chemicals) having a refractive index of 1.64 for the d-line. The optical element 301 according to this example is manufactured using the same vapor deposition material and under the same vapor deposition condition as those of Example 9. Table 10 illustrates the details of the film structure of the optical element according to this example. The refractive index and film thickness of each material satisfy inequalities (4), (5), (6), (7), (8), and (9). FIG. 12 illustrates a reflectance characteristic of the optical element according to this example. In FIG. 12, a horizontal axis represents wavelength (nm) and a vertical axis represents reflectance (%). The reflectance is maintained to be 0.2% or less in the wavelength range of 420 to 680 nm, and an excellent characteristic is demonstrated.

Table 13 illustrates the results of the durability tests. In any test, it can be confirmed that an excellent antireflection film is formed without film cracking or film peeling.

TABLE 10

|  |  |  | Refractive Index (d-line) | Physical Film Thickness (nm) |
|---|---|---|---|---|
| Multilayer Film 101 | Layer 04 | Fluorine-containing Organic Compound | 1.35 | 3.0 |
|  | Layer 03 | $SiO_2$ (Al-containing: weight ratio of 4.5%) | 1.47 | 25.0 |
|  | Layer 02 | $MgF_2$ | 1.39 | 46.6 |
|  | Layer 01 | $SiO_2$ (Al-containing: weight ratio of 4.5%) | 1.47 | 20.0 |
| Multilayer Film 111 | Layer 16 | $Ti_2O_3 + Ta_2O_5$ | 2.11 | 59.9 |
|  | Layer 15 | $SiO_2$ (Al-containing: weight ratio of 4.5%) | 1.47 | 12.0 |
|  | Layer 14 | $Ti_2O_3 + Ta_2O_5$ | 2.11 | 49.7 |
|  | Layer 13 | $SiO_2$ (Al-containing: weight ratio of 4.5%) | 1.47 | 56.8 |
|  | Layer 12 | $Ti_2O_3 + Ta_2O_5$ | 2.11 | 14.5 |

TABLE 10-continued

|  |  |  | Refractive Index (d-line) | Physical Film Thickness (nm) |
|---|---|---|---|---|
|  | Layer 11 | $SiO_2$ (Al-containing: weight ratio of 4.5%) | 1.47 | 57.4 |
| Substrate 200 |  | EP-5000 | 1.64 | — |

Example 11

Figure 13:
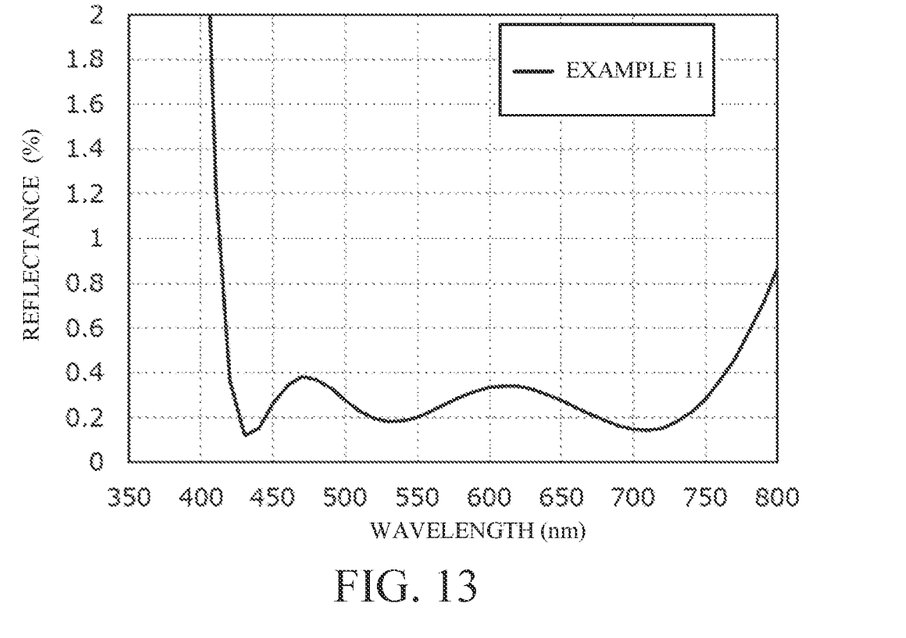
FIG. 13 illustrates a reflectance characteristic of the optical element according to Example 11 at an incident angle of 0 degrees.

In the optical element 301 according to Example 11, the substrate 200 is made of E48R (manufactured by Nippon Zeon Co., Ltd.) having a refractive index of 1.53 for the d-line. The optical element 301 according to this example is manufactured using the same vapor deposition material and under the same vapor deposition conditions as those of Example 11. Table 11 illustrates the details of the film structure of the optical element according to this example. The refractive index and film thickness of each material satisfy inequalities (4), (5), (6), (7), (8), and (9). FIG. 13 illustrates a reflectance characteristic of the optical element according to this example. In FIG. 13, a horizontal axis represents wavelength (nm) and a vertical axis represents reflectance (%). The reflectance is maintained to be 0.4% or less in the wavelength range of 420 to 760 nm, and an excellent characteristic is demonstrated.

Table 13 illustrates the results of the durability tests. In any test, it can be confirmed that an excellent antireflection film is formed without film cracking or film peeling.

TABLE 11

|  |  |  | Refractive Index (d-line) | Physical Film Thickness (nm) |
|---|---|---|---|---|
| Multilayer Film 101 | Layer 04 | Fluorine-containing Organic Compound | 1.35 | 3.0 |
|  | Layer 03 | $SiO_2$ (Al-containing: weight ratio of 4.5%) | 1.47 | 25.0 |
|  | Layer 02 | $MgF_2$ | 1.39 | 53.1 |
|  | Layer 01 | $SiO_2$ (Al-containing: weight ratio of 4.5%) | 1.47 | 20.0 |
| Multilayer Film 111 | Layer 16 | $Ti_2O_3 + Ta_2O_5$ | 2.11 | 46.4 |
|  | Layer 15 | $SiO_2$ (Al-containing: weight ratio of 4.5%) | 1.47 | 12.0 |
|  | Layer 14 | $Ti_2O_3 + Ta_2O_5$ | 2.11 | 68.0 |
|  | Layer 13 | $SiO_2$ (Al-containing: weight ratio of 4.5%) | 1.47 | 38.7 |
|  | Layer 12 | $Ti_2O_3 + Ta_2O_5$ | 2.11 | 18.9 |
|  | Layer 11 | $SiO_2$ (Al-containing: weight ratio of 4.5%) | 1.47 | 38.6 |
| Substrate 200 |  | E48R | 1.53 | — |

Example 12

Figure 14:
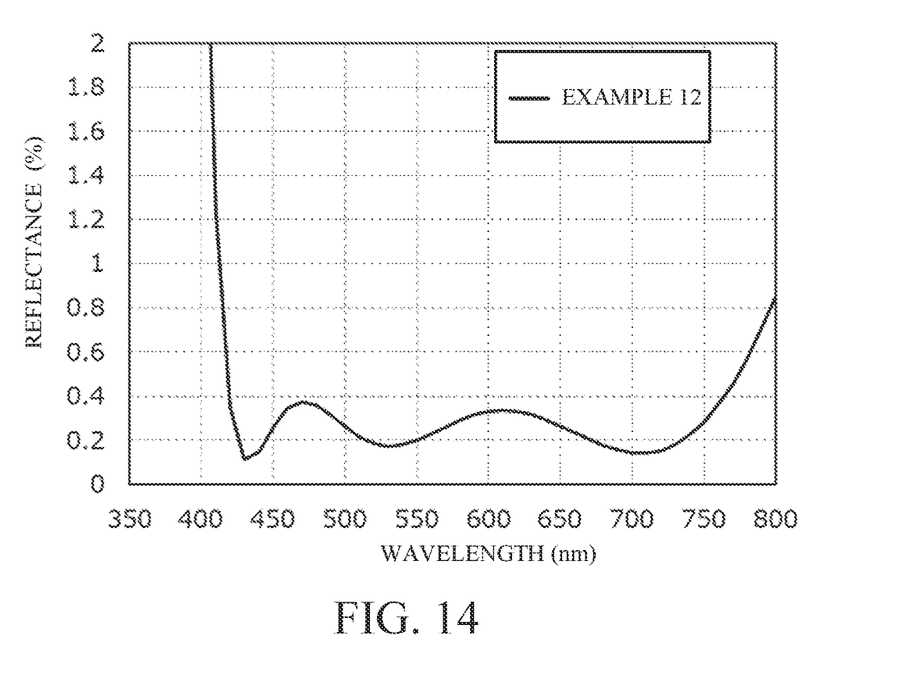
FIG. 14 illustrates a reflectance characteristic of the optical element according to Example 12 at an incident angle of 0 degrees.

In the optical element 301 according to Example 12, the substrate 200 is made of EP-5000 (Mitsubishi Gas Chemical Co., Ltd.) having a refractive index of 1.64 for the d-line. The optical element 301 according to this example is manufactured using the same vapor deposition material and under the same vapor deposition condition as those of Example 9. Table 12 illustrates the details of the film structure of the optical element according to this example. The refractive index and film thickness of each material satisfy inequalities (4), (5), (6), (7), (8), and (9). FIG. 14 illustrates a reflectance characteristic of the optical element according to this example. In FIG. 14, a horizontal axis represents wavelength (nm) and a vertical axis represents reflectance (%). The reflectance is maintained to be 0.4% or less in the wavelength range of 420 to 760 nm, and an excellent characteristic is demonstrated.

Table 13 illustrates the results of the durability tests. In any test, it can be confirmed that an excellent antireflection film is formed without film cracking or film peeling.

TABLE 12

| | | | Refractive Index (d-line) | Physical Film Thickness (nm) |
|---|---|---|---|---|
| Multilayer Film 101 | Layer 04 | Fluorine-containing Organic Compound | 1.35 | 3.0 |
| | Layer 03 | $SiO_2$ (Al-containing: weight ratio of 4.5%) | 1.47 | 20.0 |
| | Layer 02 | $MgF_2$ | 1.39 | 59.4 |
| | Layer 01 | $SiO_2$ (Al-containing: weight ratio of 4.5%) | 1.47 | 20.0 |
| Multilayer Film 111 | Layer 16 | $Ti_2O_3 + Ta_2O_5$ | 2.11 | 44.0 |
| | Layer 15 | $SiO_2$ (Al-containing: weight ratio of 4.5%) | 1.47 | 12.0 |
| | Layer 14 | $Ti_2O_3 + Ta_2O_5$ | 2.11 | 73.4 |
| | Layer 13 | $SiO_2$ (Al-containing: weight ratio of 4.5%) | 1.47 | 34.5 |
| | Layer 12 | $Ti_2O_3 + Ta_2O_5$ | 2.11 | 24.3 |
| | Layer 11 | $SiO_2$ (Al-containing: weight ratio of 4.5%) | 1.47 | 31.5 |
| Substrate 200 | | EP-5000 | 1.64 | — |

TABLE 13

| | AR Effect | H-Temp & H-Humid | Low-Temp Test | High-Temp Test | Adhesion Test | Surface Hardness |
|---|---|---|---|---|---|---|
| Example 1 | ○ | ○ | ○ | ○ | ○ | ○ |
| Example 2 | ○ | ○ | ○ | ○ | ○ | ○ |
| Example 3 | ○ | ○ | ○ | ○ | ○ | ○ |
| Example 4 | ○ | ○ | ○ | ○ | ○ | ○ |
| Example 5 | ○ | ○ | ○ | ○ | ○ | ○ |
| Example 6 | ○ | ○ | ○ | ○ | ○ | ○ |
| Example 7 | ○ | ○ | ○ | ○ | ○ | ○ |
| Example 8 | ○ | ○ | ○ | ○ | ○ | ○ |
| Example 9 | ○ | ○ | ○ | ○ | ○ | ○ |
| Example 10 | ○ | ○ | ○ | ○ | ○ | ○ |
| Example 11 | ○ | ○ | ○ | ○ | ○ | ○ |
| Example 12 | ○ | ○ | ○ | ○ | ○ | ○ |

Example 13

Figure 15:
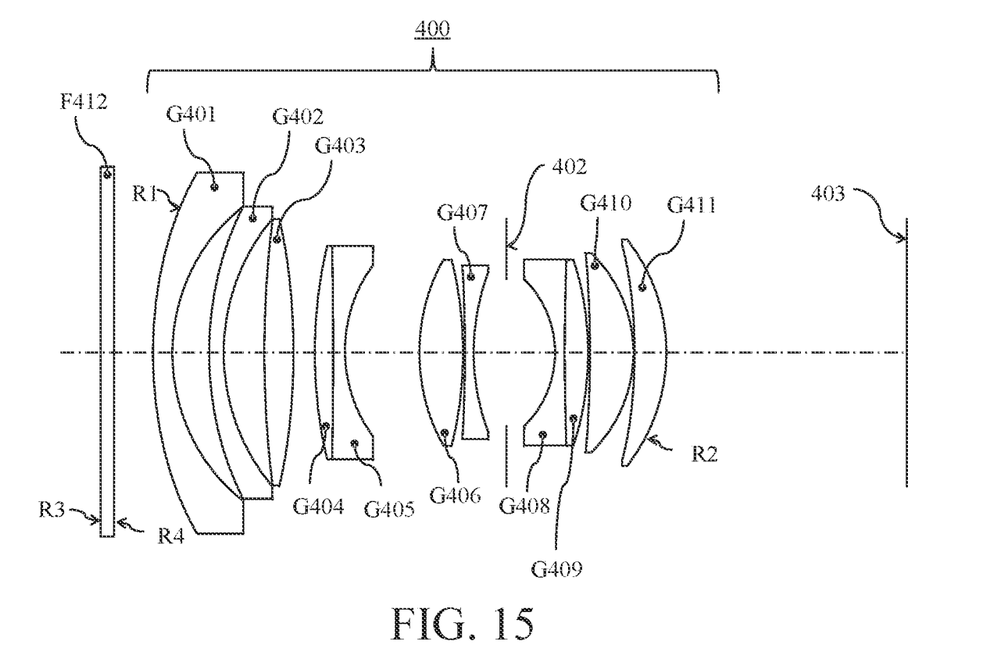
FIG. 15 is a sectional view of an optical system according to Example 13.

Referring now to FIG. 15, a description will be given of an optical system according to Example 13. FIG. 15 is a sectional view of an optical system 400. The optical system 400 includes a plurality of optical elements G401 to G411. Reference numeral 402 denotes an aperture stop (diaphragm), and reference numeral 403 denotes an image plane. Reference numeral F412 denotes an optical filter disposed on the object side of the optical system 400.

The optical elements G401 to G411 are lenses respectively. At least one of the incident surface and the exit surface of these lenses has the antireflection film according to any one of Examples 1 to 12. That is, the plurality of optical elements G401 to G411 include the optical element 300 on which the antireflection film 100 according to any one of Examples 1 to 8 is formed or the optical element 301 on which the antireflection film 110 according to any according to Examples 9 to 12 is formed.

An R1 surface of the optical element G401 and an R2 surface of the optical element G411 are the outermost surfaces of optical system 400. The antireflection film 100 or the antireflection film 110 may be applied to the R1 surface and the R2 surface because dirt and the like are likely to adhere to them. The optical filter F412 is an optical element that is disposed closer to the object than the optical element G401 and is removable according to the intended use. Thus, the antireflection film 100 or the antireflection film 110 may be applied to an R3 surface and an R4 surface of the optical filter F412, because dirt and the like are likely to adhere to them.

The optical system 400 according to this example is not limited to an imaging optical system that is used for an image pickup apparatus, which will be described below, and is applicable to optical systems for various purposes such as binoculars, projectors, and telescopes.

Example 14

Figure 16:
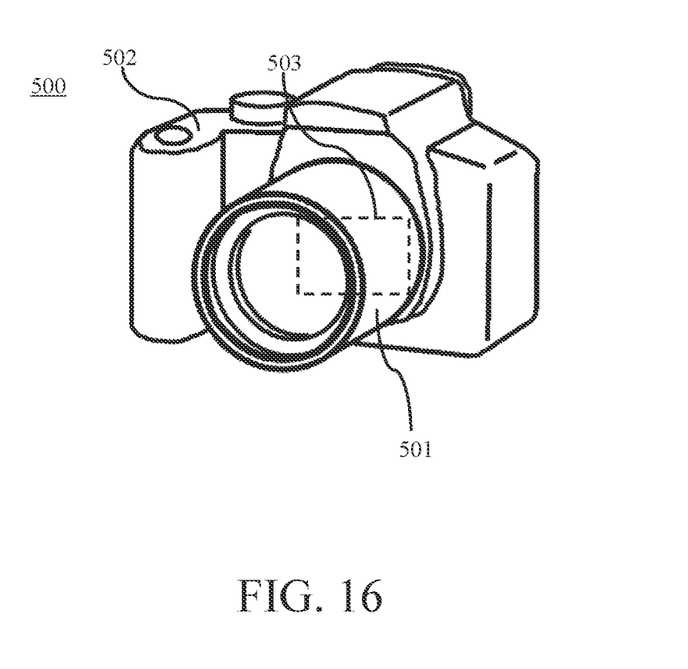
FIG. 16 is an external perspective view of the image pickup apparatus according to Example 14.

Referring now to FIG. 16, a description will be given of an image pickup apparatus (optical apparatus) according to Example 14. FIG. 16 is an external perspective view of the image pickup apparatus (digital camera 500).

The digital camera 500 includes a camera body 502 and a lens apparatus (optical apparatus) 501 integrated with the camera body 502. However, this example is not limited, and the lens apparatus 501 may be an interchangeable lens attachable to and detachable from the camera body 502 for a single-lens reflex camera, a mirrorless camera, or the like. In this case, FIG. 16 corresponds to a state in which the lens apparatus 501 is attached to the camera body 502. The lens apparatus 501 includes the optical system 400 according to Example 13, for example. The camera body 502 includes an image sensor 503 such as a CMOS sensor or a CCD sensor. The image sensor 503 is disposed on the image plane 403 of the optical system 400.

Each example can provide an optical element, an optical system, and an optical apparatus, each of which has high mechanical strength, environmental durability, and antifouling performance.

While the disclosure has been described with reference to examples, it is to be understood that the disclosure is not limited to the disclosed examples. The scope of the following claims is to be accorded the broadest interpretation so as to encompass all such modifications and equivalent structures and functions.

This application claims the benefit of Japanese Patent Application No. 2022-041285, filed on Mar. 16, 2022, which is hereby incorporated by reference herein in its entirety.

What is claimed is:

1. An antireflection film comprising:
   a first film formed on a substrate; and
   a second film formed on the first film,
   wherein the second film comprises a first layer, a second layer, and a third layer arranged consecutively in order from a side closer to the first film,
   wherein the first layer includes magnesium fluoride,
   wherein the second layer includes silicon oxide at a weight ratio of 90% or more and aluminum oxide at a weight ratio of 10% or less, and
   wherein the third layer includes a fluorine-containing organic compound.

2. The antireflection film according to claim 1, wherein the following inequality is satisfied:

$$\lambda/8 \leq n_1 d_1 + n_2 d_2 + n_3 d_3 \leq \lambda/2$$

where $n_1$ is a refractive index for d-line of the first layer, $n_2$ is a refractive index for the d-line of the second layer, $n_3$ a refractive index for the d-line of the third layer, $d_1$ (nm) is a physical film thickness of the first layer, $d_2$ (nm) is a physical film thickness of the second layer, $d_3$ (nm) is a physical film thickness of the third layer, and $\lambda$ (nm) is a wavelength of the d-line.

3. The antireflection film according to claim 2, wherein the following inequality is satisfied:

$$\lambda/6 \leq n_1 d_1 + n_2 d_2 + n_3 d_3 \leq \lambda/3.$$

4. The antireflection film according to claim 1, wherein the following inequality is satisfied:

$$0.2 \leq n_1 d_1 / (n_1 d_1 + n_2 d_2) \leq 0.9$$

where $n_1$ is a refractive index for d-line of the first layer, $n_2$ is a refractive index for the d-line of the second layer, $d_1$ (nm) is a physical film thickness of the first layer, and $d_2$ (nm) is a physical film thickness of the second layer.

5. The antireflection film according to claim 4, wherein the following inequality is satisfied:

$$0.6 \leq n_1 d_1 / (n_1 d_1 + n_2 d_2) \leq 0.9.$$

6. The antireflection film according to claim 1, wherein the following inequality is satisfied:

$$1.4 \leq n_2 \leq 1.5$$

where $n_2$ is a refractive index for the d-line of the second layer.

7. The antireflection film according to claim 1, wherein a layer adjacent to the second film in the first film includes tantalum oxide.

8. An optical element comprising the antireflection film according to claim 1 and the substrate.

9. An optical system comprising a plurality of optical elements,
wherein the plurality of optical elements includes the optical element according to claim 8.

10. An optical apparatus comprising:
an image sensor; and
an optical element according to claim 1.

11. An antireflection film comprising:
a first film formed on a substrate; and
a second film formed on the first film,
wherein the second film comprises a first layer, a second layer, a third layer, and a fourth layer in order from a side closer to the first film,
wherein each of the first layer and third layer includes silicon oxide at a weight ratio of 90% or more and aluminum oxide at a weight ratio of 10% or less,
wherein the second layer includes magnesium fluoride, and
wherein the fourth layer includes a fluorine-containing organic compound.

12. The antireflection film according to claim 11, wherein the following inequality is satisfied:

$$\lambda/8 \leq n_{2\text{-}1} d_{2\text{-}1} + n_1 d_1 + n_{2\text{-}2} d_{2\text{-}2} + n_3 d_3 \leq \lambda/2$$

where $n_{2\text{-}1}$ is a refractive index for d-line of the first layer, $n_1$ is a refractive index for the d-line of the second layer, $n_{2\text{-}2}$ is a refractive index for the d-line of the third layer, $n_3$ is a refractive index for the d-line of the fourth layer, $d_{2\text{-}1}$ (nm) is a physical film thickness of the first layer, $d_1$ (nm) is a physical film thickness of the second layer, $d_{2\text{-}2}$ (nm) is a physical film thickness of the third layer, $d_3$ (nm) is a physical film thickness of the fourth layer, and $\lambda$ (nm) is a wavelength of the d-line.

13. The antireflection film according to claim 12, wherein the following inequality is satisfied:

$$\lambda/6 \leq n_{2\text{-}1} d_{2\text{-}1} + n_1 d_1 + n_{2\text{-}2} d_{2\text{-}2} + n_3 d_3 \leq \lambda/3.$$

14. The antireflection film according to claim 11, wherein the following inequalities are satisfied:

$$0.2 \leq n_1 d_1 / (n_{2\text{-}1} d_{2\text{-}1} + n_1 d_1 + n_{2\text{-}2} d_{2\text{-}2}) \leq 0.9$$

$$0.5 \leq n_{2\text{-}1} d_{2\text{-}1} / n_{2\text{-}2} d_{2\text{-}2} \leq 2.0$$

where $n_{2\text{-}1}$ is a refractive index for d-line of the first layer, $n_1$ is a refractive index for the d-line of the second layer, $n_{2\text{-}2}$ is a refractive index for the d-line of the third layer, $n_3$ is a refractive index of the fourth layer in the d-line, $d_{2\text{-}1}$ (nm) is a physical film thickness of the first layer, $d_1$ (nm) is a physical film thickness of the second layer, $d_{2\text{-}2}$ (nm) is a physical film thickness of the third layer, $d_3$ (nm) is a physical film thickness of the fourth layer, and $\lambda$ (nm) is a wavelength of the d-line.

15. The antireflection film according to claim 14, wherein the following inequalities are satisfied:

$$0.4 \leq n_1 d_1 / (n_{2\text{-}1} d_{2\text{-}1} + n_1 d_1 + n_{2\text{-}2} d_{2\text{-}2}) \leq 0.8$$

$$0.8 \leq n_{2\text{-}1} d_{2\text{-}1} / n_{2\text{-}2} d_{2\text{-}2} \leq 1.2.$$

16. The antireflection film according to claim 11, wherein the following inequalities are satisfied:

$$1.4 \leq n_{2\text{-}1} \leq 1.5$$

$$1.4 \leq n_{2\text{-}2} \leq 1.5$$

where $n_{2\text{-}1}$ is a refractive index for d-line of the first layer, and $n_{2\text{-}2}$ is a refractive index for the d-line of the third layer.

17. The antireflection film according to claim 11, wherein a layer adjacent to the second film in the first film includes tantalum oxide.

18. An optical element comprising the antireflection film according to claim 11 and the substrate.

19. An optical system comprising a plurality of optical elements,
wherein the plurality of optical elements includes the optical element according to claim 18.

20. An optical apparatus comprising:
an image sensor; and
an optical element according to claim 18.

* * * * *